United States Patent Office 2,899,316
Patented Aug. 11, 1959

2,899,316

STABILIZED CELLULOSE ESTER COMPOSITIONS AND PROCESS FOR PREPARING THE SAME

Benjamin P. Rouse, Jr., and Roy O. Hill, Jr., Kingsport, Tenn., assignors to Eastman Kodak Company, Rochester, N.Y., a corporation of New Jersey No Drawing. Application February 13, 1957
Serial No. 639,860

15 Claims. (Cl. 106—173)

This invention relates to stabilized lower fatty acid ester of cellulose compositions, which may be subjected to high temperatures in the air without developing excessive color or experiencing excessive loss of chain length, which contain mixed with the cellulose ester an alkali metal acidoxalate, a salt of a metal and an alicyclic acid and a substituted phenol.

It is known that cellulose esters as prepared in the conventional manner from wood pulp or cotton linters tend to discolor at high temperatures and undergo chain cleavage. As many of these esters are useful for compositions which may be subjected to elevated temperatures such as in molding compositions, textiles or the like, it is desirable to stabilize them against the effects of elevated temperatures.

In the manufacture of lower fatty acid esters of cellulose, sulfuric acid is ordinarily employed as the catalyst. This results in a product containing sulfate groups. The presence of these groups tends to catalyze viscosity breakdown and color development upon heating of the ester. Often in the preparation of the cellulose ester, the spent catalyst may be neutralized before its precipitation from the bath in which it was prepared. Even so, there remains a small proportion of combined sulfur in the ester in the form of a sulfuric acid residue. If this combined sulfur is not neutralized, the ester will develop acidity during its life. If, on the other hand, the sulfuric acid residue is neutralized, the salts present in the cellulose ester as a result of that neutralization may cause or accelerate discoloration of the ester or a composition containing the ester when exposed to ultraviolet light or heat. Thus there may be a decided disadvantage in the use of such esters especially in situations involving elevated temperatures such as in molding, textile fibers, etc.

Various methods have been developed for stabilizing lower fatty acid ester of cellulose compositions which stabilized ester compositions are satisfactory when employed under atmospheric conditions. Other of the stabilizing methods proposed are in addition useful for stabilizing ester compositions to be employed at elevated temperatures but many of the stabilizing treatments proposed are limited in the temperature to which the cellulose ester may be heated without discoloration or chain cleavage occurring. Some of the stabilizing procedures proposed are inconvenient in that in the treatment of the ester it has been necessary to resort to washing to remove the salts which were incorporated in the ester during that treatment.

One object of our invention is to provide a method of stabilizing cellulose ester compositions against the effect of heat in an oxygen-containing atmosphere. Another object of our invention is to provide cellulose ester compositions having good stability at comparatively high temperatures such as on the order of 250° C. A further object of our invention is to provide a method of stabilizing cellulose ester compositions in which the dry cellulose ester is stabilized without the use of any washing steps. A still further object of our invention is to avoid the use of any stabilizing materials which have an irritating effect on the human skin. Other objects of our invention will appear herein.

We have found that the effect of atmospheric oxygen on cellulose ester compositions at temperatures as high as 250° C. can be considerably reduced, without any washing of the ester being required during or after its stabilization, if the ester is treated by the following sequence of steps:

(1) The combined sulfur in the cellulose ester is neutralized by the addition of 0.01–0.05 percent of an alkali metal acid oxalate, preferably potassium acid oxalate, based on the weight of the cellulose ester.

(2) There is incorporated in the cellulose ester in an operation in which the cellulose ester is softened, such as by heating, salt stabilizer of the type described herein which is either soluble in the cellulose ester composition or is liquid at the temperature employed in preparing the composition.

(3) A monohydroxy, monocyclic substituted phenol, the substituents of which are methoxy or aliphatic hydrocarbon radicals, is aded to the cellulose ester.

The various materials specified in steps 1, 2 and 3 can be added and can remain in the cellulose ester composition without causing any adverse effects such as haze or bad effect upon the color stability. Compositions in accordance with our invention represent an improvement in one or more respects over cellulose ester compositions which have been prepared heretofore.

In previous stabilization methods, either the cellulose ester stabilized has had limited heat stability or one or more of the materials which have been employed in the stabilization operation has had to be washed out of the cellulose ester after the treatment therewith to obtain most desirable properties. In cases where only combined sulfur was neutralized and an antioxidant was added, it was found that when the neutralization was only carried to the point where the combined sulfur was neutralized, chain length stability at high temperatures such as 250° C. was sacrificed. Where an amount of neutralizing agent greater than necessary for neutralizing combined sulfate had been employed it has been found that at high temperatures such as 250° C. poor color stability resulted. In some cases involving the use of an excess of neutralizing agent either bad haze characteristics have appeared or color stability has been sacrificed. Where salt stabilizer and antioxidant have been employed but without neutralization of the combined sulfur in the cellulose ester with potassium acid oxalate, for example, discoloration has occurred at high temperatures.

One advantage of our invention is that after the first step in which the combined sulfur in the cellulose ester has been neutralized with alkali metal acid oxalate, the material thus obtained may be stored, if desired. In that case salt stabilizer and antioxidant may be added at the time the cellulose ester material is to be used which operation may, if desired, be accompanied by the addition of plasticizer. Some of the salt stabilizers may, when added in sufficient amount, give both good stabilization and plasticization of the cellulose ester. The substituted phenol antioxidant may be conveniently added at this time.

Our invention is directed to the stabilizing of lower fatty acid esters of cellulose having no more than 0.01 percent of total combined sulfur; this includes cellulose acetates, cellulose acetate butyrates, cellulose acetate propionates, cellulose butyrates or cellulose proprionates prepared as follows:

(1) The cellulose is esterified in a dope esterification process, using as catalyst, 1.5–10 percent of sulfuric acid, based on the dry weight of the cellulose. To obtain esters of good viscosity the esterification temperature is not usually allowed to rise above 100° F.

(2) Following the esterification, the anhydride in the completed esterification mass is destroyed usually by the addition of water in the form of aqueous fatty acid. In addition, aqueous acid is used to impart hydrolysis conditions to the mass. This addition may include magnesia or a magnesium compound of a weak acid (e.g. magnesium acetate) to neutralize, at least partially, the sulfuric acid therein. The addition of the aqueous acid for hydrolysis and the hydrolysis itself is carried out usually at a temperature within the range of 110–180° F., the aqueous acid being added at such a rate that it is uniformly worked into the hydrolysis mixture.

(3) The ester hydrolyzed to the desired degree is precipitated with aqueous acid, such as in powder form. This precipitate is thoroughly washed with water of low mineral content (such as less than 20 p.p.m. mineral content). Distilled water or demineralized water is usually used. Three or four thorough washings usually reduces the ash content of the cellulose ester to .015–.047 percent.

In the last washing or as a separate addition after the last washing and before drying, the potassium acid oxalate is conveniently added to the cellulose ester to neutralize combined sulfur therein. The potassium acid oxalate which is added in a proportion within the range of .01–.05 percent, based on the weight of the cellulose ester, constitutes 0.4–1 mole and preferably 0.6–0.8 mole thereof per mole of combined sulfate in the ester. The potassium acid oxalate is well incorporated in the cellulose ester and remains therein; hence there should be no washing of the ester subsequent to the addition of the potassium acid oxalate.

The salt stabilizer which is incorporated in the cellulose ester after the alkali metal acid oxalate treatment is a salt of one of the following cations: aluminum, calcium, magnesium, copper, cobalt, manganese, barium, strontium, zinc, lead, tin, cadmium, chromium and iron. The anions of the stabilizing salts are in the main selected from the radicals of the alicyclic acids which are less acidic than the lower fatty acids less (than $1.86 \times 10^{-5}$ dissociation constant) and give salts with the cations listed which are dispersible in a cellulose ester composition at a temperature of 200° C. under anhydrous conditions. Some of the alicyclic acids, the salts of which answer these requirements, are the following: naphthenic acid, abietic acid, cyclohexane carboxylic acid, cyclohexane propionic acid, 3-methyl-cyclopentyl acetic acid, 4-methylcyclohexane carboxylic acid, cyclopentyl acetic acid, cyclopentane carboxylic acid, 2,2,6-trimethyl-cyclohexane carboxylic acid, 2,3-dimethylcyclopentyl acetic acid, 2-methylcyclopentyl propionic acid and the like. Some salt stabilizers which may be used in accordance with our invention for stabilizing cellulose esters in combination with an oxalate and a substituted phenol as described herein are strontium naphthenate, copper naphthenate, magnesium naphthenate, copper abietate, magnesium abietate and the like. The lead, iron and zinc salts generally of organic acids which have dissociation constants of less than $1.86 \times 10^{-5}$ are useful as stabilizers. Some salts of this type which are useful are zinc palmitate, lead oleate, zinc stearate, zinc naphthenate, iron laurate, and the like. The proportions of these stabilizer salts which are effective are found within the range of 0.01–0.5% of the cellulose ester.

Also incorporated in the cellulose ester composition is a monohydroxy monocyclic substituted phenol, the substituents of which are selected from methoxy and aliphatic hydrocarbon radicals. This phenol has the effect of inhibiting the formation of carboxylic acid groups in the cellulose ester at elevated temperatures. The amount of substituted phenol which is incorporated may conveniently be 0.2 percent of the cellulose ester but some variation in proportion is permissible. For instance, proportions of these phenols as low as .01 percent have been found to be operative. In some cases plasticizing amounts of the substituted phenols such as 2–5 percent or more have been useful. Some of the substituted phenols which are useful in compositions in accordance with our invention for stabilizing cellulose esters are tertiary butyl phenol, thymol, eugenol, isopropyl phenol, guaiacol, carvacrol, dimethyl phenol, trimethyl phenol, 2-methoxy-4-methyl phenol and the like.

In preparing cellulose ester compositions in accordance with our invention, the alkali metal acid oxalate may be conveniently incorporated as an aqueous solution in the cellulose ester while the ester is in damp form. The cellulose ester thus treated may be subjected to drying. The cellulose ester material thus treated may be stored ready for use if desired, or storage would be unnecessary if intended for immediate use in preparing compositions in accordance with our invention.

The salt stabilizer is incorporated into the cellulose ester to which the oxalate had been added under elevated temperature conditions so that it may be thoroughly worked into said ester. This may be done, for instance, by working up the cellulose ester and the salt stabilizer on hot rolls having a temperature on the order of 200° C. The salt stabilizer which is used in accordance with our invention either must be liquid or readily dissolve in the cellulose ester material at the roll temperature employed. The substituted phenol is conveniently incorporated in the cellulose ester in the same operation. Usually in this operation the plasticizer is added also. In many situations the presence of a plasticizer may be of assistance in assuring homogeneity of the stabilizing salt and the cellulose ester material.

The use of a plasticizer in compositions in accordance with our invention is especially desirable when the cellulose ester composition is to be employed for making sheeting or in plastic compositions such as would be useful in molding operations. The proportion of plasticizer used in compositions in accordance with our invention may range from 0 to 70 parts per 100 parts of cellulose ester. For molding compositions in which a cellulose acetate butyrate having a butyral content of 35–50 percent is used, some plasticizers which would be suitable therein are dibutyl sebacate, di-2-ethylhexyl phthalate, dibutyl phthalate, methoxyethyl stearate or the like. For plastic compositions of cellulose acetate such as having 38–41 percent acetyl content, any of the well known cellulose acetate plasticizers may be employed such as triphenyl phosphate, dimethyl phthalate, diethyl phthalate or the like. When incorporating the stabilizing salts listed, the cellulose ester should be in dry condition as the presence of water tends to decrease the chain length of the cellulose ester at the temperatures employed in that operation. The cellulose esters and compositions prepared in accordance with our invention are to be considered useful especially where the compositions are subjected to temperatures at or near 250° C.

The following examples illustrate our invention:

*Example 1*

Several samples of a cellulose acetate butyrate in the form of a damp powder having a butyryl content of 37%, an acetyl content of 13%, an ash content of not more than 0.05% and a sulfur content of no more than 0.01% were mixed with 0.015% of potassium acid oxalate by adding the oxalate thereto in the form of its water solution. The various samples were dried and were then mixed with five parts of dibutyl sebacate plasticizer, 0.5 part of paratertiary butyl phenol per 100 parts of cellulose ester and salt stabilizers as listed below in the percentages given based on the weight of the cellulose ester. The mixing was carried out in a Werner-Pfleiderer mixer. The thus-obtained mixtures were compounded upon polished stainless steel rolls heated to 180° C.

These compositions were then heated for ½ hour at 250° C. The compositions used and the results obtained were as follows:

| Salt Stabilizer | Concentration, percent | ½ hour at 250° C. | |
|---|---|---|---|
| | | Color | I.V. |
| Copper naphthenate | 0.01 | 12 | 1.24 |
| Magnesium naphthenate | 0.03 | 8 | 1.11 |
| Copper abietate | 0.02 | 15 | 1.14 |
| Magnesium abietate | 0.01 | 10 | 1.03 |

*Example 2*

100 parts of comminuted cellulose acetate butyrate having approximately 35% butyryl, an ash content of not more than 0.05 percent and a sulfur content of not more than 0.01 percent was mixed while damp with 0.01 part of potassium acid oxalate and was dried. 5 parts of dibutyl sebacate plasticizer, 0.02 part of strontium naphthenate and a small proportion of para-tertiary butyl phenol were mixed with the cellulose ester on hot metal rolls to form a homogeneous composition. The composition thus obtained after comminution was molded. Products were obtained even when high temperatures were employed showing minimum color, good inherent viscosity and no haze characteristics. In a second case, a like plastic composition was prepared but with as much as 0.2 part of strontium naphthenate therein. It was found that the increased amount of strontium naphthenate exhibited little adverse effect upon the cellulose ester composition when that composition was employed in high temperature molding operations in contrast to many of the common stabilizers which when used in this concentration give a plastic material which shows appreciable darkening in high temperature molding operations.

*Example 3*

A plastic composition was prepared by mixing 100 parts of comminuted cellulose acetate having approximately 40 percent acetyl content, an ash content of less than 0.05 percent and a sulfur content of less than 0.01 percent in which had been previously incorporated 0.015 part of potassium acid oxalate with 35 parts of dimethyl phthalate, 0.02 part of strontium naphthenate and a small proportion of p-tertiary butyl phenol. The mixture was made homogeneous by working it on hot rolls. The resulting composition after comminuting was employed in a molding operation. The product obtained had good characteristics, including freedom from excessive discoloration.

The inherent viscosities given after heating for ½ hour at 250° C. are indicative of the amount of breakdown at high temperatures. A cellulose ester which shows an inherent viscosity much below 0.9 after such heating is less useful for plastic purposes. The relative viscosity is determined by measuring the flow rate of a solution of 0.25 gram of the test material made up to 100 cc. with glacial acetic acid. A measure of the flow time of the solution gives the relative viscosity, this being given as the ratio of the flow time of the solution to the flow time of the acetic acid. The inherent viscosity (I.V.) of the cellulose ester is determined by multiplying the logarithm of the relative viscosity by 9.20.

The color values specified herein were determined by matching the samples after heating and dissolving in acetone against a color standard. In the case of a cellulose ester in which only one of the described materials was added, the product obtained after heating for ½ hour at 250° C. exhibited a coloration on the order of 70–100 or even more by the color test, after heating and dissolving in acetone in a proportion of 3 grams of the sample in 10 grams of acetone. The solution is matched with a color standard. These color standards range from 400 (dark amber) to 0. The 400 color is that exhibited by a composition of 0.2 gram of Ciba oil soluble yellow BB, 0.2 gram of Calco fast spirit orange R and 0.022 gram of General Dyestuffs Alizarine cyanine green G Ex. Conc. dissolved in 1 liter of dimethyl phthalate. The zero standard is the original color of the dimethyl phthalate, the values between 0 and 400 being graduated therebetween.

Cellulose esters prepared in accordance with our invention are useful for the preparation of plastic compositions particularly when a heat-stable plasticizer is employed therein. A heat-stable plasticizer may be defined as one which will not discolor when ash-free filter paper saturated therewith is subjected to a temperature of 250° C. (Anal. Chem., 23, 1962–94, 1951). If a plasticizer is found to be unstable to heat, it may be stabilized with a glycidyl ether in small quantities. The stabilized cellulose esters in accordance with our invention are characterized by their resistance to deterioration when employed in processes using relatively high temperature.

We claim:

1. A high heat resistant lower fatty acid ester of cellulose having not more than 0.01% of total combined sulfur to which has been added 0.01–0.05% of an alkali metal oxalate, a stabilizing quantity within the range of 0.01–0.5% of a salt stabilizer selected from the group consisting of aluminum, calcium, magnesium, copper, cobalt, manganese, barium, strontium, tin, cadmium, and chromium salts of the alicylic acids having dissociation constants less than $1.86 \times 10^{-5}$ and the lead, iron, and zinc salts of organic acids having dissociation constants of less than $1.86 \times 10^{-5}$, and at least 0.01% of a monohydroxy, monocyclic substitute phenyl, the substituents of which are selected from the group consisting of methoxy and alkyl.

2. A high heat resistant cellulose acetate having not more than 0.01% of total combined sulfur to which has been added 0.01–0.05% of an alkali metal oxalate, a stabilizing quantity within the range of 0.01–0.5% of a salt stabilizer selected from the group consisting of the aluminum, calcium, magnesium, copper, cobalt, manganese, barium, strontium, tin, cadmium, and chromium salts of the alicyclic acids having dissociation constants less than $1.86 \times 10^{-5}$ and the lead, iron, and zinc salts of organic acids having dissociation constants of less than $$1.86 \times 10^{-5}$$

and at least 0.01% of a monohydroxy monocyclic substituted phenol, the substituents of which are selected from the group consisting of methoxy and alkyl.

3. A high heat resistant cellulose acetate butyrate having not more than 0.01% of total combined sulfur to which has been added 0.01–0.05% of an alkali metal oxalate, a stabilizing quantity within the range of 0.01–0.5% of a salt stabilizer selected from the group consisting of the aluminum, calcium, magnesium, copper, cobalt, manganese, barium, strontium, tin, cadmium, and chromium salts of the alicylic acids having dissociation constants less than $1.86 \times 10^{-5}$ and the lead, iron, and zinc salts of organic acids having dissociation constants of less than $1.86 \times 10^{-5}$, and at least 0.01% of a monohydroxy monocyclic substituted phenol, the substituents of which are selected from the group consisting of methoxy and alkyl.

4. A high heat resistant lower fatty acid ester of cellulose having not more than 0.01% of total combined sulfur to which has been added 0.01–0.05% of potassium acid oxalate, a stabilizing quantity within the range of 0.01–0.5% of strontium naphthenate and at least 0.01% of a monohydroxy, monocyclic substituted phenol, the substituents of which are selected from the group consisting of methoxy and alkyl.

5. A high heat resistant lower fatty acid ester of cellulose having not more than 0.01% of total combined sulfur to which has been added 0.01–0.05% of potassium acid oxalate, a stabilizing quantity within the range of 0.01–0.5% of magnesium napthenate and at least 0.01% of a monohydroxy, monocyclic substituted phenol, the substituents of which are selected from the group consisting of methoxy and alkyl.

6. A high heat resistant lower fatty acid ester of cellulose having not more than 0.01% of total combined sulfur to which has been added 0.01–0.05% of potassium acid oxalate, a stabilizing quantity within the range of 0.01–0.5% of magnesium abietate and at least 0.01% of a monohydroxy, monocyclic substituted phenol, the substituents of which are selected from the group consisting of methoxy and alkyl.

7. A high heat resistant lower fatty acid ester of cellulose having not more than 0.01% of total combined sulfur to which has been added 0.01–0.05% of potassium acid oxalate, a stabilizing quantity within the range of 0.01–0.5% of copper naphthenate and at least 0.01% of a monohydroxy, monocyclic substituted phenol, the substituents of which are selected from the group consisting of methoxy and alkyl.

8. A high heat resistant lower fatty acid ester of cellulose having not more than 0.01% of total combined sulfur to which has been added 0.01–0.05% of potassium acid oxalate, a stabilizing quantity within the range of 0.01–0.5% of copper abietate and at least 0.01% of a monohydroxy, monocyclic substituted phenol, the substituents of which are selected from the group consisting of methoxy and alkyl.

9. A high heat resistant lower fatty acid ester of cellulose having no more than 0.01% of total combined sulfur to which has been added 0.01–0.05% of potassium acid oxalate, a stabilizing quantity within the range of 0.01–0.5% of a salt stabilizer selected from the group consisting of the aluminum, calcium, magnesium, copper, cobalt, manganese, barium, strontium, tin, cadmium, and chromium salts of the alicyclic acids having dissociation constants less than $1.86 \times 10^{-5}$ and the zinc, iron, and lead salts of the organic acids having dissociation constants of less than $1.86 \times 10^{-5}$, and at least 0.01% of tertiary butyl phenol.

10. A high heat resistant lower fatty acid ester of cellulose having not more than 0.01% of total combined sulfur to which has been added 0.01–0.05% of potassium acid oxalate, a stabilizing quantity within the range of 0.01–0.5% of strontium naphthenate and at least 0.01% of tertiary butyl phenol.

11. A method of preparing a stabilized lower fatty acid ester of cellulose which comprises incorporating 0.01–0.05% of potassium acid oxalate in the cellulose ester while in damp form, drying and mixing the ester under dry conditions upon hot rolls with a stabilizing quantity within the range of 0.01–0.5% of a salt stabilizer dispersible in the ester selected from the group consisting of the aluminum, calcium, magnesium, copper, cobalt, manganese, barium, strontium, tin, cadmium, and chromium salts of the alicyclic acids having dissociation constants less than $1.86 \times 10^{-5}$ and the zinc, iron, and lead salts of the organic acids having dissociation constants of less than $1.86 \times 10^{-5}$ and at least 0.01% of a monohydroxy, monocyclic substituted phenol having substituents selected from the group consisting of methoxy and alkyl whereby a product is obtained having high heat resistance.

12. A method of preparing a stabilized lower fatty acid ester of cellulose which comprises incorporating 0.01–0.05% of potassium acid oxalate in the cellulose ester while in damp form, drying and mixing the ester under dry conditions upon hot rolls with a stabilizing quantity within the range of 0.01–0.5% of a salt stabilizer dispersible in the ester, selected from the group consisting of the aluminum, calcium, magnesium, copper, cobalt, manganese, barium, strontium, tin, cadmium, and chromium salts of the alicyclic acids having dissociation constants of less than $1.86 \times 10^{-5}$ and the zinc, iron, and lead salts of the organic acids having dissociation constants of less than $1.86 \times 10^{-5}$ and at least 0.01% of tertiary butyl phenol.

13. A method of preparing a stabilized lower fatty acid ester of cellulose which comprises incorporating 0.01–0.05% of potassium acid oxalate in the cellulose ester while in damp form, drying and mixing the ester under dry conditions upon hot rolls with a stabilizing quantity within the range of 0.01–0.5% of strontium naphthenate and at least 0.01% of tertiary butyl phenol.

14. A plastic composition essentially consisting of 100 parts of a lower fatty acid ester of cellulose containing not more than 0.01 part of total combined sulfur, 0.01–0.05 parts of an alkali metal acid oxalate, a stabilizing quantity within the range of 0.01–0.5% of a salt stabilizer, selected from the group consisting of the aluminum, calcium, magnesium, copper, cobalt, manganese, barium, strontium, tin, cadmium, and chromium salts of the alicyclic acids having dissociation constants of less than $1.86 \times 10^{-5}$ and the zinc, iron, and lead salts of the organic acids having dissociation constants of less than $1.86 \times 10^{-5}$, at least 0.01 part of a monohydroxy, monocyclic substituted phenol, the substituents of which are selected from methoxy and alkyl and 0–70 parts of a heat stable plasticizer.

15. A plastic composition essentially consisting of 100 parts of a cellulose acetate butyrate having not more than 0.01 part of total combined sulfur, 0.01–0.05 part of an alkali metal acid oxalate, a stabilizing quantity within the range of 0.01–0.5% of a salt stabilizer, selected from the group consisting of the aluminum, calcium, magnesium, copper, cobalt, manganese, barium, strontium, tin, cadmium, and chromium salts of the alicyclic acids having dissociation constants of less than $1.86 \times 10^{-5}$ and the zinc, iron and lead salts of the organic acids having dissociation constants of less than $1.86 \times 10^{-5}$, at least 0.01 part of a monohydroxy, monocyclic substituted phenol, the substituents of which are selected from methoxy and alkyl and 0.70 parts of a heat stable plasticizer.

References Cited in the file of this patent

UNITED STATES PATENTS

| | | |
|---|---|---|
| 1,962,132 | Bradshaw | June 12, 1934 |
| 2,025,957 | Schneider | Dec. 31, 1935 |
| 2,300,180 | Schulze | Oct. 27, 1942 |
| 2,713,546 | Williams | July 19, 1955 |

UNITED STATES PATENT OFFICE

CERTIFICATE OF CORRECTION

August 11, 1959

Patent No. 2,899,316

Benjamin P. Rouse, Jr., et al.

It is hereby certified that error appears in the printed specification of the above numbered patent requiring correction and that the said Letters Patent should read as corrected below.

Column 2, line 22, for "aded" read -- added --; column 6, line 14, for "1962-94" read -- 1692-94 --; line 32, for "substitute phenyl" read -- substituted phenol --; column 8, line 41, for "part", second occurrence read -- parts --; line 52, for "0.70" read -- 0-70 --.

Signed and sealed this 23rd day of February 1960.

(SEAL)
Attest:

KARL H. AXLINE
Attesting Officer

ROBERT C. WATSON
Commissioner of Patent